United States Patent [19]

Wilson et al.

[11] Patent Number: 4,607,835
[45] Date of Patent: Aug. 26, 1986

[54] MULTIPLE DRIVE SHEET MOVING APPARATUS

[75] Inventors: Owen H. Wilson, Breslau; Tadeusz Pecak, Kitchener, both of Canada

[73] Assignee: NCR Corporation, Dayton, Ohio

[21] Appl. No.: 768,083

[22] Filed: Aug. 21, 1985

[51] Int. Cl.⁴ ............................................. B65H 7/02
[52] U.S. Cl. .................................. 271/227; 271/251; 271/265; 271/274
[58] Field of Search ............... 271/251, 258, 259, 261, 271/265, 272, 273, 274, 227, 228, 185

[56] References Cited

U.S. PATENT DOCUMENTS

| | | | |
|---|---|---|---|
| 3,065,835 | 11/1962 | Drillick | 197/2 |
| 3,595,565 | 7/1971 | Bergland | 271/251 |
| 3,603,446 | 9/1971 | Maxey et al. | 198/33 |
| 3,897,945 | 8/1975 | Faltot et al. | 271/227 |
| 3,908,986 | 9/1975 | Bleau | 271/227 |
| 3,936,046 | 2/1976 | Stange | 271/250 |
| 3,970,299 | 7/1976 | Berger, Jr. et al. | 271/250 |
| 4,049,256 | 9/1977 | Church et al. | 271/9 |
| 4,216,482 | 8/1980 | Mason | 346/129 |
| 4,245,836 | 1/1981 | Joosten | 271/228 |
| 4,360,195 | 11/1982 | Schon et al. | 271/3 |
| 4,410,171 | 10/1983 | Kobayashi | 271/227 |
| 4,438,917 | 3/1984 | Janssen et al. | 271/227 |
| 4,448,407 | 5/1984 | Bashford et al. | 271/8 |
| 4,483,530 | 11/1984 | Spencer | 271/227 X |
| 4,506,878 | 3/1985 | Bashford | 271/227 |

*Primary Examiner*—Richard A. Schacher
*Attorney, Agent, or Firm*—Wilbert Hawk, Jr.; Albert L. Sessler, Jr.

[57] ABSTRACT

Apparatus for driving sheets comprises a track assembly, a first plurality of drive rollers and a cooperating set of back-up rollers for transporting sheets in a first direction along the track assembly, a second plurality of drive rollers and a cooperating set of back-up rollers for driving said sheets in a second direction with respect to the track assembly, into proper position to cause them to be transported by said first plurality of drive rollers and cooperating back-up rollers, and solenoid-operated actuating mechanism for simultaneously operating both sets of back-up rollers to cause one set of back-up rollers to be moved into operative position when the other set of back-up rollers is moved out of operative position.

10 Claims, 12 Drawing Figures

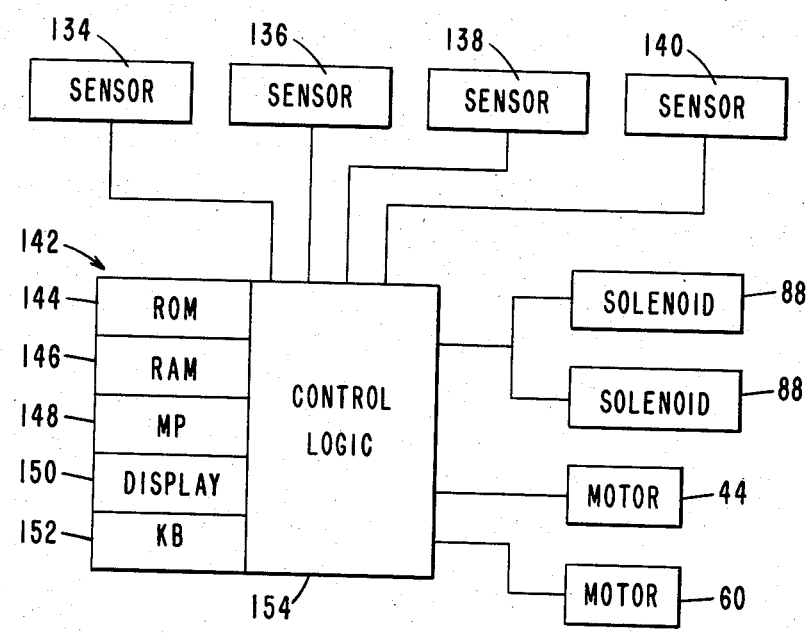
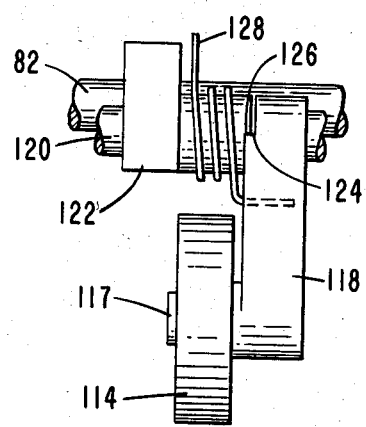
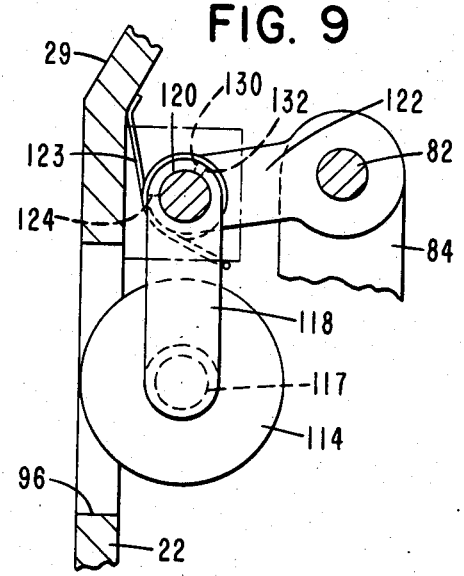

MULTIPLE DRIVE SHEET MOVING APPARATUS

BACKGROUND OF THE INVENTION

This invention relates generally to sheet moving apparatus, and more particularly relates to sheet moving apparatus which includes a track, first driving mechanism for transporting sheets along the track, and additional driving mechanism for causing the sheets to be moved, when necessary, to a position from which they are transported by the first driving mechanism.

In some types of sheet moving apparatus, such as bank check processing systems, for example, bank checks and similar documents enter the feed mechanism, as by being hand fed or fed from a hopper, into a transport track, and then are fed along the track. The documents may be fed into the track in a skewed condition, so their lower edges do not engage the bottom of the track along their entire surfaces. This can result in misfeeding, double feeding, jamming and damage to the document. In some document feeding systems, an effort is made to overcome this undesirable situation by jogging the documents before they are fed, in order to align them. However, this involves extra apparatus, and is not effective in all cases. A simple and effective mechanism to deskew documents being fed, without the need for jogging such documents, will therefore be highly desirable.

SUMMARY OF THE INVENTION

The present invention provides a multiple drive sheet moving apparatus capable of deskewing and positioning documents fed into a track and then transporting said documents along said track.

In accordance with one embodiment of the invention, a sheet moving apparatus comprises track means having first and second spaced side walls and a base extending therebetween; a first plurality of drive rollers adjacent to one of the side walls for driving a sheet along the track means; a second plurality of drive rollers positioned at an angle with respect to said first plurality of drive rollers and adjacent to one of the side walls for driving a sheet toward said base; a plurality of sensors to determine the position of the sheet within said track means; a first plurality of back-up rollers each positioned in alignment with one of said first plurality of drive rollers, and each positioned adjacent to the other of said side walls for cooperating with its corresponding drive roller to drive a sheet along the track means; a second plurality of back-up rollers, each positioned in alignment with one of said second plurality of drive rollers, and each positioned adjacent to the other of said side walls for cooperating with its corresponding drive roller to drive a sheet toward said base; first means for supporting said first plurality of back-up rollers for unitary movement into and out of operative engagement with said first plurality of drive rollers; second means for supporting said second plurality of back-up rollers for unitary movement into and out of operative engagement with said second plurality of drive rollers; and actuating means responsive to said sensors for operating both of said first and second means to cause movement of one of said first and second plurality of back-up rollers into engagement with its corresponding plurality of drive rollers and simultaneous movement of the other of said first and second plurality of back-up rollers out of engagement with its corresponding plurality of drive rollers.

It is accordingly an object of the present invention to provide a sheet moving apparatus capable of deskewing and transporting sheets fed into a transport track.

A further object is to provide a sheet moving apparatus having first drive mechanism capable of properly positioning a sheet in a transport track, second drive mechanism for transporting said sheet in said track, and mechanism to cause one of said drive mechanisms to be activated at the same time that the other drive mechanism is deactivated.

A further object is to provide a sheet moving apparatus capable of feeding or lowering a document into a track and then driving said document along said track.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 7 is a block diagram illustrating the control circuitry associated with the sheet moving apparatus of the present invention.

FIGS. 8 and 9 are fragmentary views showing the resilient means for coupling the vertical back-up rollers to the operating mechanism associated therewith.

DESCRIPTION OF THE PREFERRED EMBODIMENT

Figure 1A:
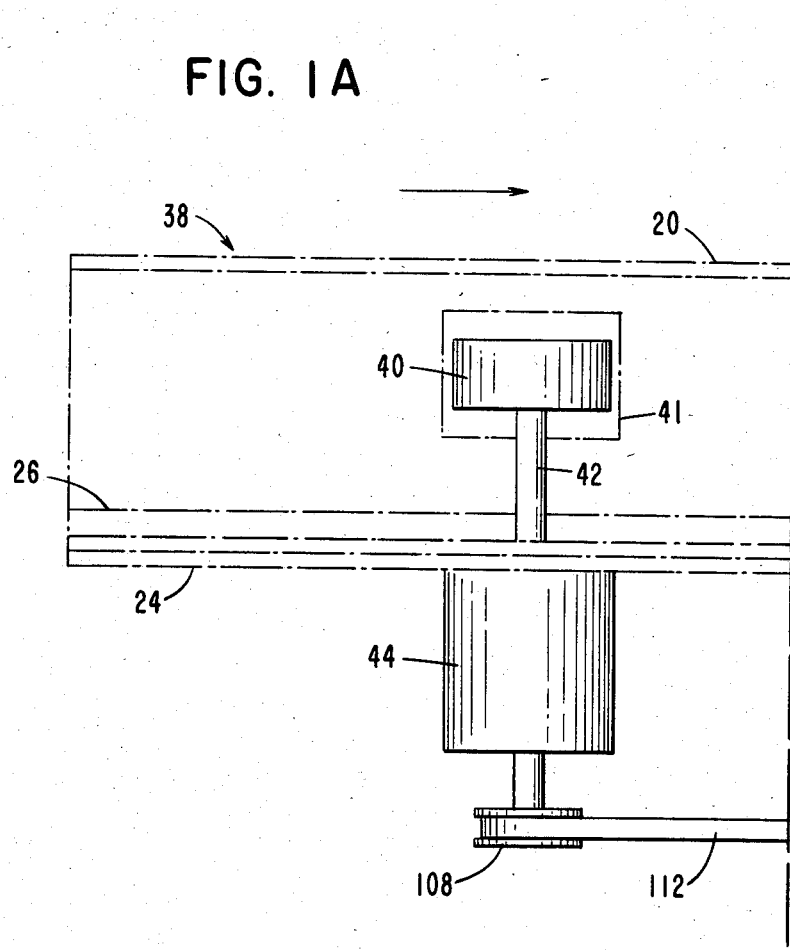
FIGS. 1A and 1B taken together constitute an elevation view of one side of a track assembly in which sheets are transported, showing a plurality of drive rollers for driving the sheets from the hopper and along the track and a plurality of drive rollers for causing sheets which are fed into the track assembly to be driven to the floor of the track.

Referring now to FIGS. 1A, 1B, 2A and 2B, the various feed rollers and back-up rollers employed for the driving of sheets are shown. It will be noted that in FIGS. 2A and 2B, the side wall of the track assembly has been removed in order to enable the drive roller mechanism to be shown in full lines, without the need for reversing the indicated direction of document flow, as compared to the showing of FIGS. 1A and 1B. A cross-sectional view of the track assembly 18 is seen in FIGS. 3 to 6 inclusive. The track assembly includes side walls 20 and 22 which are fixed to a base plate 24. A floor element or track 26 is positioned on the base plate 24 between the walls 20 and 22, and provides a surface 28, along which sheets being fed may move. The side wall 20 is flared, as indicated at 29, in the area defined by the lines 30, 32 in FIG. 1B, and 34, 36 in FIG. 2B, to provide an enlarged upper opening which facilitates the dropping of sheets or documents by hand into the track assembly 18 when desired. To the left of the hand drop area, as viewed in FIGS. 1 and 2, is a hopper, indicated generally at 38, by which sheets or documents may be introduced in quantity into the sheet driving apparatus.

Sheets or documents fed from the hopper 38 are driven to the right as indicated in FIGS. 1 and 2 by a "hard" drive mechanism, comprising a drive roller 40, driven by a shaft 42, turned by a motor 44, in cooperation with a back-up roller 46 on a shaft 48. The roller 40 extends through an aperture 41 in the side wall 20. In a "hard" drive mechanism, greater pressure is applied to a back-up roller, in order to assure driving of the sheet, than is the case with down-stream back-up rollers, where slippage may take place between the roller and the sheet if the sheet resists being fed, for any reason. The roller 46 extends through an aperture 49 in the side wall 22 and is urged toward engagement with the drive roller 40 by a strong spring 52 secured to the side wall 22 by fasteners 51. Side portions 53 of the spring 52 serve as bearings for the shaft 48.

Figure 1B:
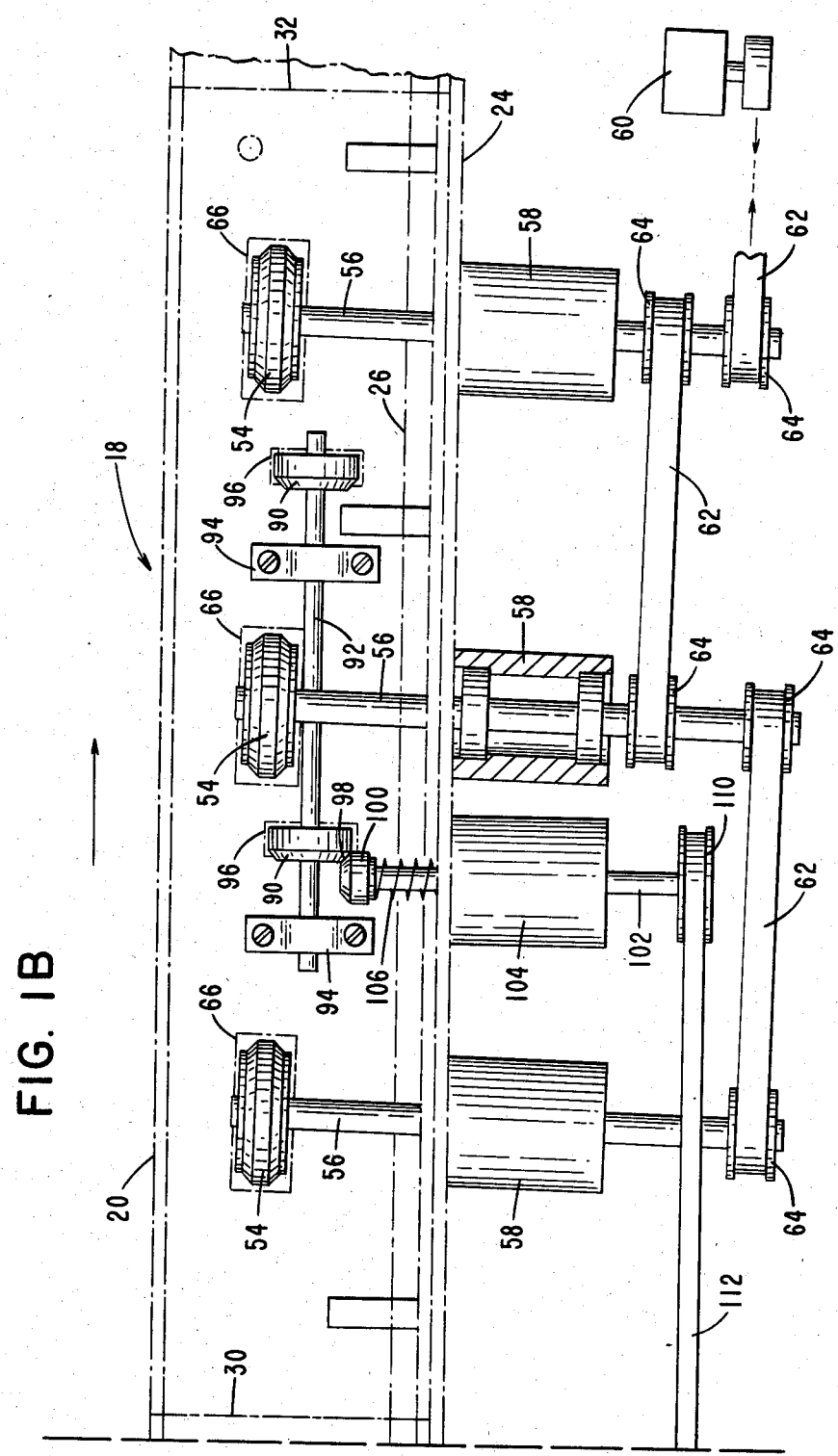
Figure 2A:
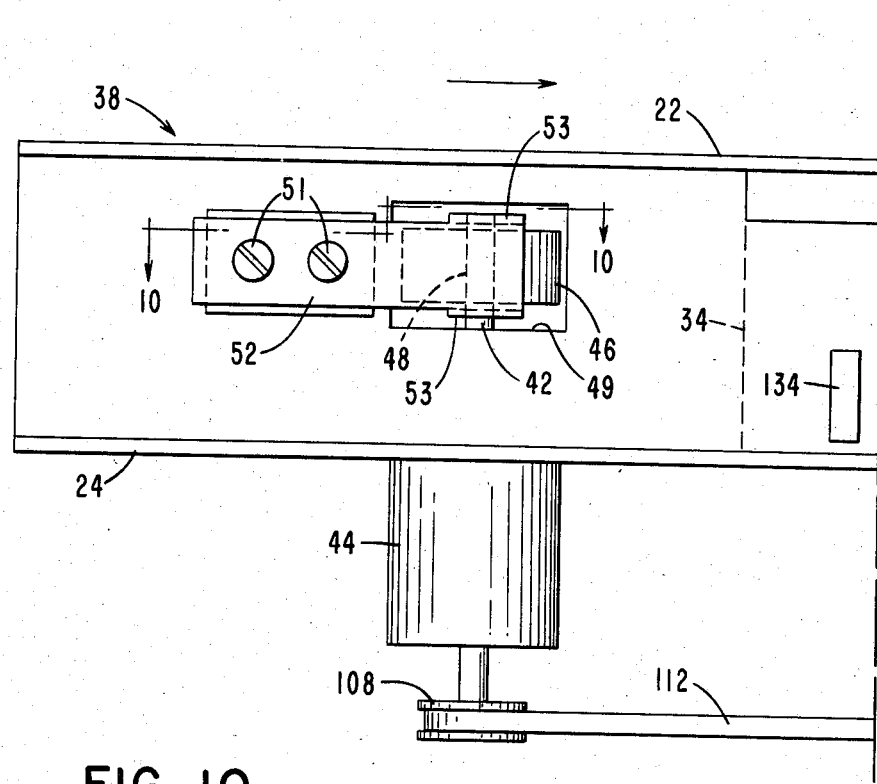
FIGS. 2A and 2B taken together constitute an elevation view of the other side of the track showing back-up rollers which cooperate with the drive rollers and mechanism for moving the back-up rollers into and out of cooperative driving relationship with their corresponding drive rollers.
Figure 10:
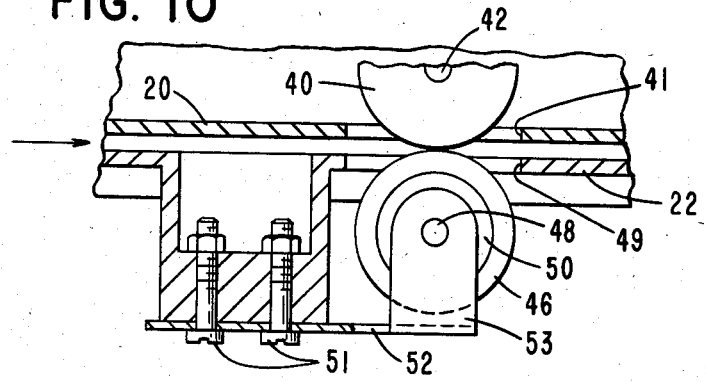
FIG. 10 is a fragmentary sectional view taken along line 10—10 of FIG. 2A.
Figure 2B:
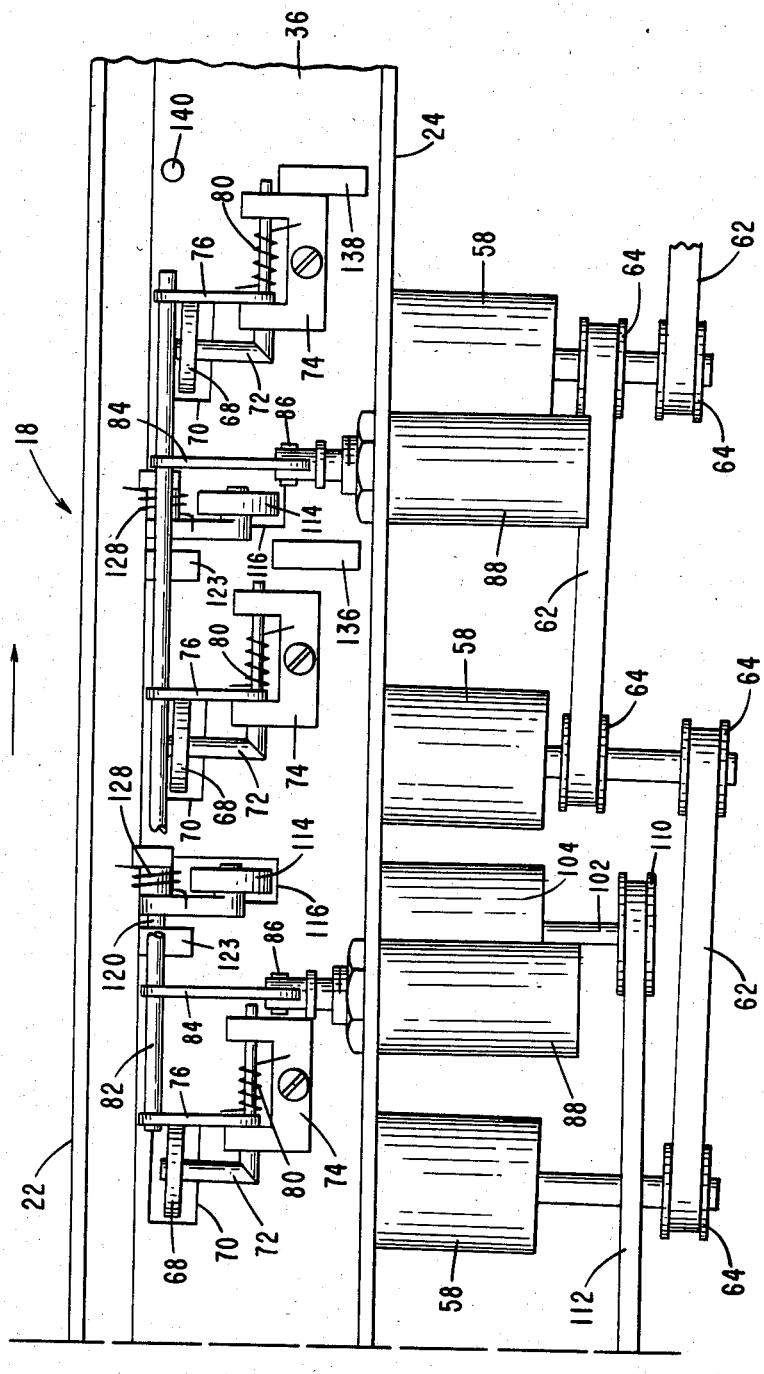

Documents which enter the hand dropped area either by being fed from the hopper 38 or by being dropped vertically between the walls 20, 22 in the area of the flared portion 29 of the wall 22, are then in a position to be fed to the right, as viewed in FIGS. 1B and 2B. Before proper feeding can take place, however, these documents must be in proper position, with their bottom edges resting on the surface 28.

Figure 3:
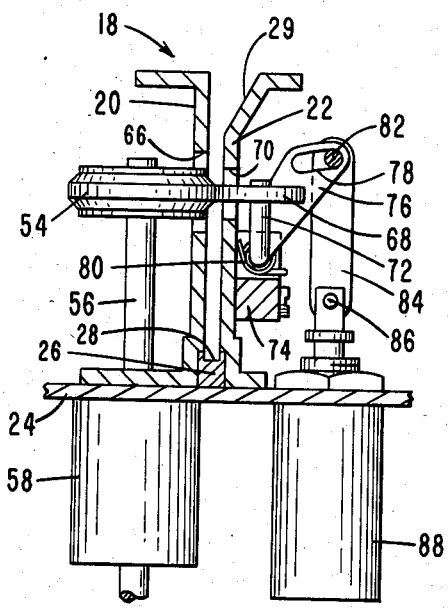
FIG. 3 is a cross-sectional view of the track assembly showing a substantially horizontal drive roller and a substantially horizontal back-up roller in position to cause sheet feeding.
Figure 4:
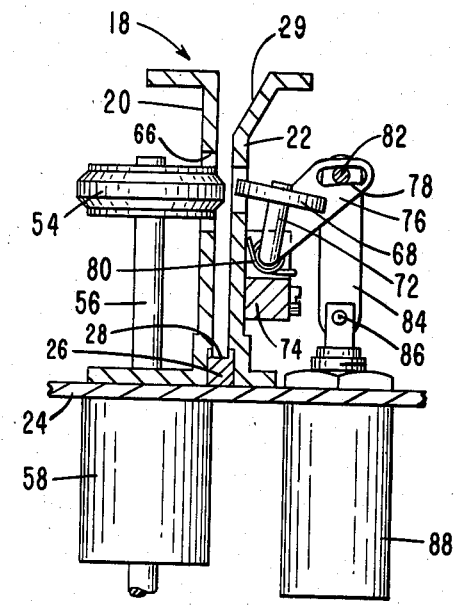
FIG. 4 is a view similar to FIG. 3, but with the substantially horizontal drive roller and the substantially horizontal back-up roller in non-driving position.

As best shown in FIGS. 1B, 3 and 4, the means for driving documents along the track assembly 18, in a horizontal direction as shown in FIG. 1B, includes a plurality of drive rollers 54 mounted on shafts 56 which are journaled in bearing housing assemblies 58. It will be noted from FIG. 1B that the drive rollers 54 and shafts 56 are disposed at slight angles, preferably from 1.5 to 3 degrees, from the horizontal and vertical, respectively, so that the documents being driven are urged slightly downwardly as well as horizontally to the left. The shafts 56 are driven by a motor 60 through a plurality of appropriately arranged belts 62 and pulleys 64, as shown in FIG. 1B. The drive rollers 54 extend through apertures 66 in the wall 20 so that their peripheral driving surfaces are engageable with documents to be driven.

As best shown in FIGS. 2B, 3 and 4, a plurality of back-up rollers 68, one for each drive roller 54, extend through apertures 70 in the wall 22 to function in cooperative relation with the drive rollers 54 for the driving of documents. The back-up rollers 68 are mounted to rotate freely on right angle shaft 72, each of which has a horizontal portion which is journaled in a bracket 74 fixed to the wall 22. Fixed to the horizontal portion of each shaft 72 is a lever arm 76 which contains a slot 78 near the free end thereof. A spring 80 is wound around each shaft 72, with ends engaging the bracket 74 and the lever arm 76 to urge the back-up roller 68 into engagement with the drive roller 54.

Extending through each of the slots 78 of the lever arm 76 in a direction parallel to the track assembly 18 is a rod 82. Two links 84 connect the rod 82 through pivot points 86 to a pair of solenoids 88. The solenoids 88 operate in unison. When they are not energized, in the position shown in FIG. 3, the springs 80 urge the back-up rollers 68 into operative engagement with the drive rollers 54 for the driving of documents along the track assembly 18. Energization of the solenoids 88 causes the links 84 to move downwardly, which causes the rod 82, acting through the slot 78 in the lever arms 76, to rock the shaft 72 against the force of the springs 80, thereby moving the back-up rollers 68 out of operative engagement with the drive rollers 54, to the position shown in FIG. 4.

Documents which are hand dropped or moved into the track assembly 18 from the hopper 38 may be improperly located with their bottom edges not completely abutting the surface 28 of the track 26. A slight separation of the document edge from the surface 28 may be corrected by the downward angled increment of the driving action of the drive roller 54, but this is not sufficient to correct any substantial positional error of a document. Feeding of a document along the track in a position substantially elevated from the track surface 28 is likely to result in misfeeding and damage to the document. It is therefore important to assure that the documents are properly positioned at the beginning of their movement along the track assembly 18.

A plurality of vertical drive rollers 90 (FIGS. 1B, 5 and 6) are fixed to a shaft 92 which is journaled in bearings 94 mounted on the wall 20. The vertical drive rollers 90 extend through apertures 96 in the wall 20 so that their peripheral driving surfaces are engageable with documents to be driven vertically. At least one of the vertical driving rollers 90 is provided with an angled surface 98 which cooperates with an angled driving element 100, such as a friction gear, fixed to one end of a vertical shaft 102, which is journaled in a bearing housing assembly 104 fixed to the base plate 24. The element 100 is maintained in driving engagement with the surface 98 of the roller 90 by a spring 106 coiled around the shaft 102 and extending between the element 100 and the base plate 24. The shaft 102 may be driven by any suitable means. In FIG. 1B, it is shown as being driven by the motor 44, acting through pulleys 108 and 110 and a belt 112.

Figure 5:
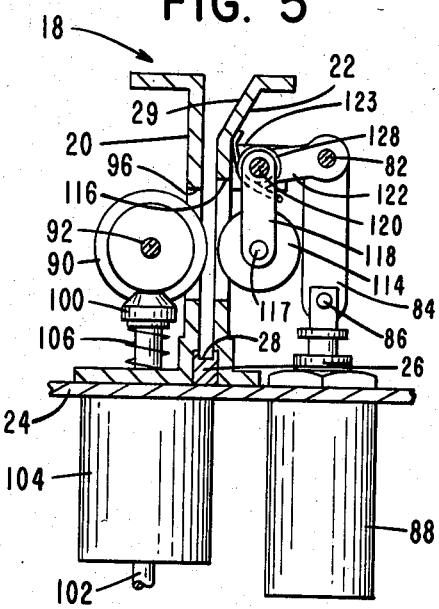
FIG. 5 is a cross-sectional view of the track assembly showing the vertical drive roller and the vertical back-up roller in non-driving position.
Figure 6:
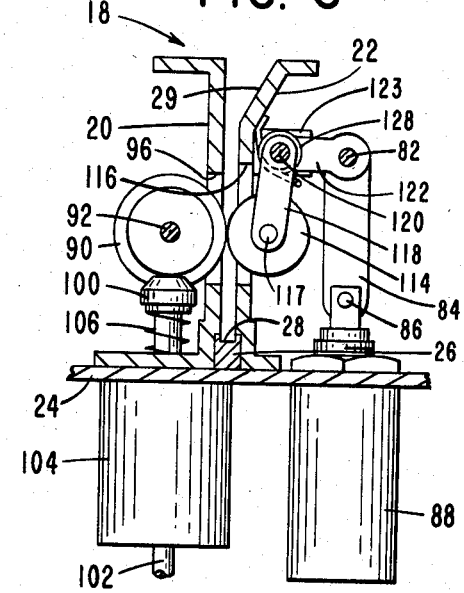
FIG. 6 is a cross-sectional view of the track assembly showing the vertical drive roller and the vertical back-up roller in position to cause sheet feeding.

As shown in FIGS. 5 and 6, a plurality of back-up rollers 114, one for each vertical drive roller 90, extend through apertures 116 in the wall 22 to function in cooperative relation with the drive rollers 90 for the vertical positioning of documents. Each back-up roller 114 is rotatably mounted on a stub shaft 117 fixed in one end of the first arm 118 which is mounted on the shaft 120 and flexibly coupled to a second arm 122 which is mounted at one end on the shaft 120 and mounted at its other end on the shaft 82. The shaft 120 is journaled in brackets 123 secured to the wall 22. The interconnection between the arms 118 and 122 includes a "lost motion" coupling comprising complementary cut-away portions on the two arms. The surface 124 on the arm 118 normally engages the surface 126 on the arm 122 under the urging of a spring 128 which is coiled around a portion of the arm 120. The ends of the spring 128 engage the wall 22 and the arm 118. In the event that the back-up roller 114 is urged with excessive force against the drive roller 90 by improper adjustments of the linkage between it and the solenoids 88, the arm 118 may shift with respect to the arm 122 against the force of the spring 128, by virtue of the space provided between the surface 130 on the arm 118 and the surface 132 on the arm 122, as best shown in FIGS. 8 and 9.

In normal operation, it will be seen that with the solenoids 88 deenergized, as shown in FIG. 5, the back-up rollers 114 do not engage their corresponding drive rollers 90, and accordingly, no substantial downward movement is imparted to a document being fed. When the solenoids 88 are energized, the arm 122 is rocked clockwise as viewed in FIGS. 5, 6, 8 and 9, to the position in which it is shown in FIG. 6. This causes the arm 118 also to be rocked clockwise, to move the back-up roller 114 into operative engagement with the vertical drive roller 90, to cause downward movement of any document positioned between the two rollers 90 and 114.

By comparison of FIGS. 3 and 4 of FIGS. 5 and 6, it will be seen, as noted earlier, that when the solenoids 88 are deenergized, the mechanism of the present invention is positioned to cause horizontal document feeding, and that when the solenoids 88 are energized, the mechanism of the present invention is positioned to cause vertical document feeding.

The condition of the solenoids 88 is based upon the presence and position of documents within the track assembly 18, and this is ascertained by a plurality of sensors 134, 136, 138 and 140. As best shown in FIGS. 2A and 2B, the sensors 134, 136 and 138 are positioned to detect the presence of a document adjacent to the floor of track assembly 18, and the sensor 140 is positioned to detect the presence of a document in an elevated position in the track assembly.

FIG. 7 is a schematic diagram of the control circuitry 142 which may used in connection with the mechanism of the present invention. This control circuitry is conventional and may include a read only memory (ROM) 144, a random access memory (RAM) 146, a data processor such as an appropriately programmed microprocessor (MP) 148, a display 150 for communication purposes, a keyboard 152 for entry of data and instructions, and additional conventional circuitry designated generally as control logic 154, which contains the appropriate logic circuitry and interface circuitry to enable the sheet moving apparatus to function in the manner intended.

With respect to operation of the system, it should be noted that the hopper document drive motor 44 and the track document drive motor 60 are normally continuously operating, under control of the control circuitry 142. The sensors 134, 136, 138, and 140 provide information to the control circuitry 142 as to the location of the document being fed, which enables the control circuitry 142 to make a decision as to whether and when the solenoids 88 should be energized. If the sensors 134, 136, 138 and 140 indicate that the document is properly positioned for feeding, the solenoids 88 will remain deenergized, so that the back-up rollers 68 are in operative engagement with the horizontal drive rollers 54 and cause the document to be driven along the track, and the back-up rollers 114 remain out of operative engagement with the vertical drive rollers 90. On the other hand, if the sensors 134, 136, 138 and 140 indicate that the document has been driven along the track assembly 18 from the hopper 38 in an elevated or skewed position, or has been hand-dropped in such a manner that it has not bottomed properly on the track surface 28, the solenoids 88 will be energized, which shifts the horizontal back-up rollers 68 out of operative engagement with their corresponding horizontal drive rollers 54, and simultaneously shifts the vertical back-up rollers 114 into operative engagement with the vertical drive rollers 90 to position the document vertically so that it is properly placed for horizontal driving or feeding along the track assembly 18. It will be noted that due to the operation of both the horizontal and vertical drive mechanism by the same solenoids, acting in unison, and due to the mechanical interconnection between the horizontal and vertical back-up rollers 68 and 114, the situation will not arise in which both the horizontal and vertical drive mechanism are simultaneously operating on a document, which might result in damage to the document and jamming of the feed mechanism.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A sheet moving apparatus comprising:
    track means having first and second spaced side walls and a base extending therebetween;
    a first plurality of drive rollers adjacent to one of the side walls for driving a sheet along the track means;
    a second plurality of drive rollers positioned at an angle with respect to said first plurality of drive rollers and adjacent to said one of the side walls for driving a sheet towards said base;
    a plurality of sensors to determine the position of a sheet within said track means;
    a first plurality of back-up rollers, each positioned in alignment with one of said first plurality of drive rollers, and each positioned adjacent to the other of said side walls for cooperating with its corresponding drive roller to drive a sheet along the track means;
    a second plurality of back-up rollers, each positioned in alignment with one of said second plurality of drive rollers, and each positioned adjacent to the other of said side walls for cooperating with its corresponding drive roller to drive a sheet toward said base;
    first means for supporting said first plurality of back-up rollers for unitary movement into and out of operative engagement with said first plurality of drive rollers;
    second means for supporting said second plurality of back-up rollers for unitary movement into and out of operative engagement with said second plurality of drive rollers;
    actuating means responsive to said sensors for operating both of said first and second means to cause movement of one of said first and second plurality of back-up rollers into engagement with its corresponding plurality of drive rollers, and simultaneous movement of the other of said first and second plurality of back-up rollers out of engagement with its corresponding plurality of drive rollers.

2. The sheet moving apparatus of claim 1, in which the actuating means comprises at least two solenoids controlled for simultaneous operation and an operating rod coupled thereto and extending therebetween.

3. The sheet moving apparatus of claim 2, also including first mounting means for pivotally mounting shafts of said plurality of back-up rollers on the exterior of said other of said side walls; and first linking means for linking said shafts to said operating rod.

4. The sheet moving apparatus of claim 3, in which said operating rod extends through an angled slot in said first linking means, whereby said first plurality of back-up rollers are caused to move by the interaction of said operating rods with said slot in said linking means.

5. The sheet moving apparatus of claim 3, also including a supporting arm for each of said second plurality of back-up rollers; second mounting means for pivotally mounting supporting arms of said second plurality of back-up rollers on the exterior of said other of said side walls; and second linking means for linking said supporting arms to said operating rod.

6. The sheet moving apparatus of claim 4, also including a resilient connection between each supporting arm and linking means of said second plurality of back-up rollers.

7. The sheet moving apparatus of claim 5, in which the resilient connection between each supporting arm and linking means is a torsion spring, whereby predetermined pressure is provided between said second plurality of drive rollers and said second plurality of back-up rollers.

8. The sheet moving apparatus of claim 2, in which the first plurality of back-up rollers is in operative engagement with its corresponding plurality of drive rollers to drive said sheet when said solenoids are deenergized, and in which the second plurality of back-up rollers is in operative engagement with its corresponding plurality of drive rollers to drive said sheet when said solenoids are energized.

9. The sheet moving apparatus of claim 1 in which the plurality of sensors includes a pair of sensors located adjacent to the base to provide an indication of whether the edge of a sheet is engaging the base, and at least one sensor positioned on a side wall at an elevation from the base to provide an indication of whether a portion of a sheet is located at that elevation from the base.

10. A sheet moving apparatus comprising:
   track means having first and second spaced side walls and a base extending therebetween;
   a first plurality of drive rollers positioned substantially parallel to said base, each having a portion extending through one of the side walls for driving a sheet along the track means;
   a second plurality of drive rollers positioned substantially perpendicular to said base, each having a portion extending through said one of the side walls for driving a sheet to a position in which one edge thereof engages said base;
   a plurality of sensors to determine the position of a sheet within said track means;
   a first plurality of back-up rollers, each positioned in alignment with one of said first plurality of drive rollers, and each having a portion extending through the other of said side walls for cooperating with its corresponding drive roller to drive a sheet along the track means;
   a second plurality of back-up rollers, each positioned in alignment with one of said second plurality of drive rollers, and each having a portion extending through the other of said side walls for cooperating with its corresponding drive roller to drive a sheet to a position in which one edge thereof engages said base;
   first means for supporting said first plurality of back-up rollers for unitary movement into and out of operative engagement with said first plurality of drive rollers;
   second means for supporting said second plurality of back-up rollers for unitary movement into and out of operative engagement with said second plurality of drive rollers;
   third means for causing simultaneous operation of said first means and said second means; and
   actuating means responsive to said sensors for operating said third means to cause movement of one of said first and second plurality of back-up rollers into engagement with its corresponding plurality of drive rollers, and simultaneous movement of the other of said first and second plurality of back-up rollers out of engagement with its corresponding plurality of drive rollers.

* * * * *